US009166821B2

(12) United States Patent
Knauerhase et al.

(10) Patent No.: US 9,166,821 B2
(45) Date of Patent: *Oct. 20, 2015

(54) PROVIDER PRESENCE INFORMATION

(75) Inventors: Robert Knauerhase, Portland, OR (US);
Mic Bowman, Beaverton, OR (US);
Paul Brett, Hillsboro, OR (US); Robert Adams, Lake Oswego, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/971,275

(22) Filed: Dec. 17, 2010

(65) Prior Publication Data

US 2011/0087778 A1 Apr. 14, 2011

Related U.S. Application Data

(63) Continuation of application No. 12/941,891, filed on Nov. 8, 2010, now Pat. No. 8,380,789, which is a continuation of application No. 11/566,521, filed on Dec. 4, 2006, now Pat. No. 7,840,636.

(51) Int. Cl.
*G06F 15/16* (2006.01)
*H04L 12/58* (2006.01)

(52) U.S. Cl.
CPC .............. *H04L 12/581* (2013.01); *H04L 51/04* (2013.01); *H04L 51/046* (2013.01)

(58) Field of Classification Search
CPC ... H04L 12/5815; H04L 12/582; H04L 51/04; H04L 51/046; G06F 17/30696
USPC ........................................................ 709/204
See application file for complete search history.

(56) References Cited

U.S. PATENT DOCUMENTS

| 6,345,303 | B1 | 2/2002 | Knauerhase et al. |
| 6,430,602 | B1 | 8/2002 | Kay et al. |
| 6,549,937 | B1* | 4/2003 | Auerbach et al. ............ 709/206 |
| 6,757,722 | B2 | 6/2004 | Lonnfors et al. |
| 6,944,555 | B2 | 9/2005 | Blackett et al. |
| 7,035,923 | B1* | 4/2006 | Yoakum et al. .............. 709/224 |
| 7,548,922 | B2* | 6/2009 | Altaf et al. ........................ 1/1 |
| 7,890,886 | B2* | 2/2011 | Matthews et al. ............ 715/809 |
| 7,962,470 | B2* | 6/2011 | Degenkolb et al. .......... 707/709 |
| 2003/0084018 | A1* | 5/2003 | Chintalapati et al. ............ 707/1 |
| 2003/0110228 | A1* | 6/2003 | Xu et al. ....................... 709/207 |
| 2004/0078424 | A1 | 4/2004 | Yairi et al. |
| 2004/0230636 | A1* | 11/2004 | Masuoka et al. ............. 708/800 |

(Continued)

OTHER PUBLICATIONS

Day et al., "RFC: 2778 A Model for Presence and Instant Messaging," Feb. 2000, pp. 1-35.

(Continued)

*Primary Examiner* — Joseph E Avellino
*Assistant Examiner* — James Conaway
(74) *Attorney, Agent, or Firm* — Schwabe, Williamson & Wyatt, P.C.

(57) ABSTRACT

In some embodiments, a client computer includes a memory, a client presence program adapted to be located in the memory, and a processor. The processor is coupled to the memory and is adapted to execute the client presence program to receive provider presence information from an instant messaging (IM) server and to store the provider presence information in the memory. The provider presence information includes at least a provider status for at least one service provider.

20 Claims, 9 Drawing Sheets

(56) References Cited

U.S. PATENT DOCUMENTS

| | | | |
|---|---|---|---|
| 2005/0069138 A1* | 3/2005 | de Jong | 380/278 |
| 2005/0138132 A1* | 6/2005 | Zhou et al. | 709/207 |
| 2005/0198303 A1 | 9/2005 | Knauerhase et al. | |
| 2005/0278425 A1 | 12/2005 | Wilsher et al. | |
| 2005/0289141 A1* | 12/2005 | Baluja | 707/6 |
| 2006/0150119 A1* | 7/2006 | Chesnais et al. | 715/810 |
| 2007/0083627 A1* | 4/2007 | Mohammed et al. | 709/223 |
| 2007/0143434 A1 | 6/2007 | Daigle | |
| 2007/0168490 A1 | 7/2007 | Kent et al. | |
| 2007/0255795 A1* | 11/2007 | Wang et al. | 709/207 |
| 2007/0271257 A1* | 11/2007 | Kari et al. | 707/5 |
| 2007/0274233 A1 | 11/2007 | Ptashek et al. | |
| 2008/0114776 A1 | 5/2008 | Sun et al. | |
| 2008/0133645 A1 | 6/2008 | Fridman et al. | |
| 2008/0133738 A1 | 6/2008 | Knauerhase et al. | |
| 2008/0256107 A1 | 10/2008 | Banga et al. | |
| 2008/0313329 A1 | 12/2008 | Wang et al. | |
| 2009/0248868 A1* | 10/2009 | Classen et al. | 709/224 |
| 2010/0070581 A1 | 3/2010 | Hewes et al. | |
| 2011/0078270 A1 | 3/2011 | Galli et al. | |

OTHER PUBLICATIONS

Jabber Software Foundation, RFC 3920:Extensible Messaging and Presence Protocol (XMPP): Core, Oct. 2004, jabber Software Foundation, http://xmpp.org/rfcs/.

Jabber Software Foundation, RFC 3921:Extensible Messaging and Presence Protocol (XMPP): Instant Messaging and Presence, Oct. 2004, Jabber Software Foundation, http://xmpp.org/fcs/.

Cheung, Using IM Bots for Jabber, Jun. 25, 2005 http://www.chatopus.com/articles/bots.html.

Adams, XEP-0009: Jabber-RPC, Feb. 9, 2006, http://xmpp.org/extensions/xep-0009.html.

XMPP.org, XMPP RFCS main page, Mar. 4, 2008, http://xmpp.org/rfcs/.

Saint-Andre, XEP-0055: Jabber Search, Mar. 22, 2004, http://xmpp.org/extensions/xep-0055.html.

Staudinger, XEP-0067: Stock Data Transmission, Jul. 19, 2003, http://xmpp.org/extensions/exp-0067.html.

Berthe, Mcabbber (1) Manual Page, Jul. 1, 2006, http://www.lilotux.net/~mikael/mcabber/ (abailable in internet archives).

Moffitt, Thoughts on Scalable XMPP Bots, Aug. 4, 2008, http://metajack.wordpress.com/2008/08/04/thoughts-on-scalable-xmpp-bots/.

Back, Attack of the AOL Aim Bots!, Nov. 17, 2005.

Badlop, Shared Roster Group Screenshots, Apr. 19, 2005.

Office Action for U.S. Appl. No. 11/566,521, mailed Dec. 31, 2008, 22 pages.

Final Office Action for U.S. Appl. No. 11/566,521, mailed Jul. 30, 2009, 18 pages.

Notice of Allowability for U.S. Appl. No. 11/566,521, mailed Jul. 14, 2010, 5 pages.

Office Action for U.S. Appl. No. 12/941,891, mailed Apr. 15, 2011, 19 pages.

Office Action, issued in U.S. Appl. No. 12/941,891, mailed Oct. 19, 2011, 14 pages.

Advisory Action, issued in U.S. Appl. No. 12/941,891, mailed Jan. 4, 2012, 3 pages.

Office Action issued in U.S. Appl. No. 12/941,891, mailed Jun. 15, 2012, 15 pages.

* cited by examiner

PROVIDER PRESENCE INFORMATION

CROSS REFERENCE TO RELATED APPLICATIONS

The present application is a continuation of, and claims priority to, U.S. patent application Ser. No. 12/941,891, filed Nov. 8, 2010; which in turn is a continuation of U.S. patent application Ser. No. 11/566,521, filed Dec. 4, 2006, now U.S. Pat. No. 7,840,636.

BACKGROUND

1. Technical Field

Embodiments of the present invention are related to the field of electronic devices, and in particular, to presence systems.

2. Description of Related Art

A presence and instant messaging (IM) system allows clients (users) to subscribe to each other and be notified of changes in state, and for clients to send each other short instant messages. With an IM service, one or more IM servers may be used. The IM server automatically manages the presence information for the clients, distributing the information as needed or requested. Presence is a way for a client to make its connection or availability known or available to other clients. Typically, operation of an IM service requires both the recipient (a client) and the sender (also a client) of the instant message to be online at the same time.

A network may have many attached devices offering and/or seeking services, capabilities and/or resources of other devices. It is often difficult to locate devices offering particular services. To facilitate locating and tracking devices and their services, various "web service" or "directory service" technologies have been implemented.

DETAILED DESCRIPTION OF ILLUSTRATIVE EMBODIMENTS

Figure 1:
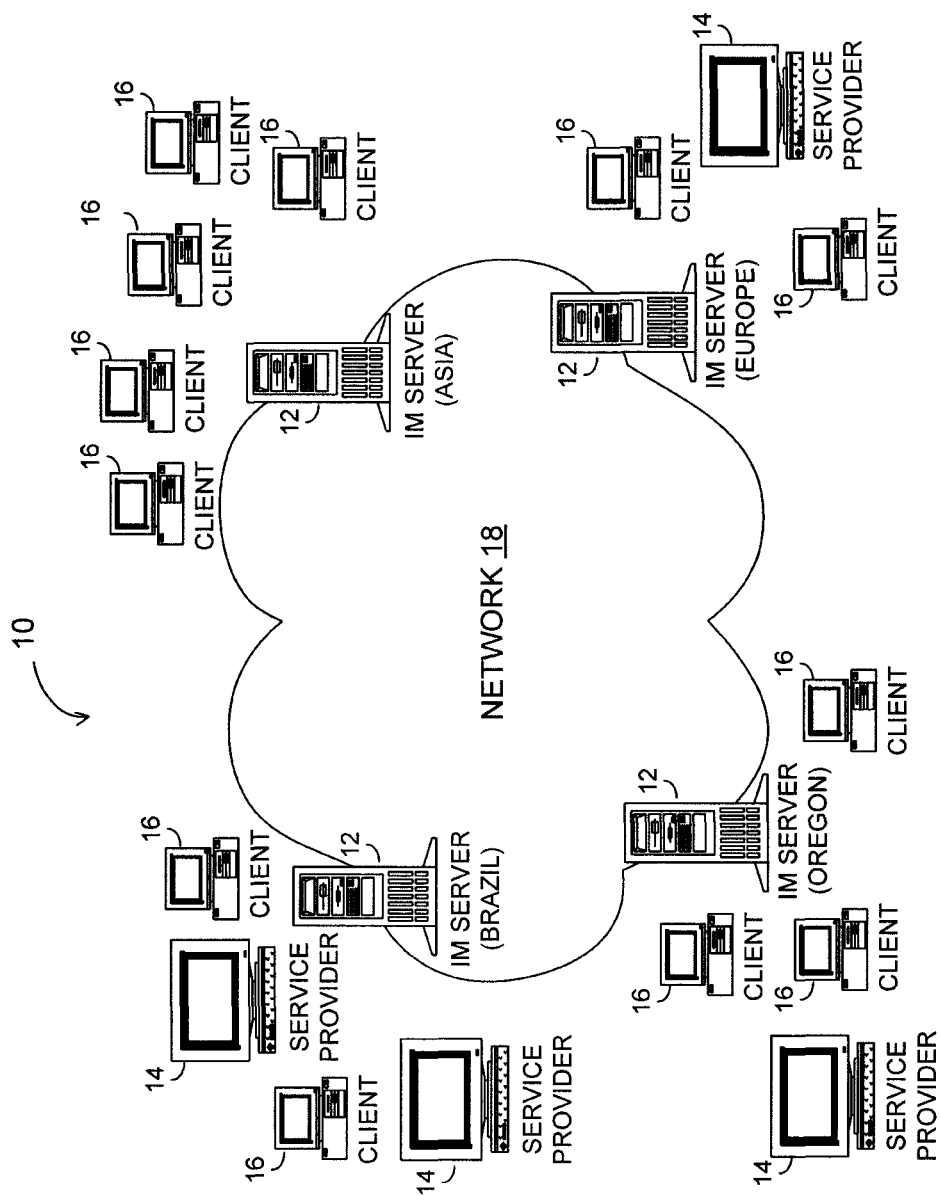
FIG. 1 is a diagram of an IM system, according to some embodiments of the present invention.

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention. The term "coupled" shall encompass a direct connection, an indirect connection or an indirect communication.

In the following description, terminology is used to discuss certain features of various embodiments of the present invention, with the use of the following terms:

An "instant message (IM) server" may provide a "presence service" and an "instant message service", with the presence service accepting "presence information", storing it, and distributing it and the instant message service accepting from clients and delivering "instant messages" to clients. The instant message service may provide online chats for clients. The presence service may provide "client presence information" to watcher clients, for example, in the form of buddy lists showing online clients. According to the various embodiments of the present invention, the presence service also may provide "provider presence information" describing one or more service providers to watcher clients.

A "client" or "client computer" may include any device that is capable of receiving presence information. Examples of such clients may include a cellular phone, personal digital assistant (PDA), laptop, workstation, personal computer, blackberry device, good link device, or any other computing device or mobile device.

A "presentity" may be a client ("presentity client") or a service provider and may provide presence information, in accordance with a presence protocol, to an IM server. As a presentity, a service provider may provide "provider presence information" to the IM server and the presentity client may provide "client presence information" to the IM server.

A "watcher client" may be a client that receives client presence information from the presence service of the IM server in accordance with a presence protocol. A watcher client may be characterized as an "IM watcher client" when watching for client presence information and/or a "service watcher client" when watching for provider presence information.

The "watcher client" also may be categorized as a client who is a "fetcher" or a "subscriber". A fetcher may simply request the current value of some presentity's presence information from the presence service. In contrast, a subscriber may request notification from the presence service of (future) changes in some presentity's presence information. A special kind of fetcher is one that fetches information on a regular basis and may be called a "poller".

A "presence protocol" defines the interaction between the presence service, presentities, and watchers and is used to distribute presence information. Presence information is carried by the presence protocol. An example of a presence protocol is given in the informational Request for Comments (RFC) 2778 entitled, "A Model for Presence and Instant Messaging", by M. Day, J. Rosenberg, and H. Sugano (The Internet Society, February 2000).

A "service provider" may provide one or more services (e.g., distributed services) to one or more clients. In accordance with the various embodiments of the present invention, the service provider may be characterized as a presentity in that it provides provider presence information about its services to one or more IM servers. In some embodiments, the services may be web services. Some examples of such services may include providing of news, stock quotes, MP3 files, distance learning classes, organizational procedures, etc.

A "service instance" may be an individual service or subservice of a specific service of a service provider. In some embodiments, there may be one or more types of subservices, with each subservice being a server program for handling a particular type of client interaction. In some embodiments, the term "service instance" is not intended to include the same service associated with a different "hosting environments" or other the same service associated with different "service qualifying characteristics". In other embodiments, a service instance may be more narrowly defined to include one or more service qualifying characteristics.

A "hosting environment" of a service provider is a "service qualifying characteristic" and may be characterized by a specific operating system, a version of the server program, patches, libraries, and/or managed runtime environments, such as the Java platform by Sun Microsystems, Inc., or the Common Language Runtime by Microsoft Corporation, etc. (Java is a trademark or registered trademark of Sun Microsystems, Inc. in the United States and other countries.). For example, if the only difference between service instances is the versions of the service instances, this version information may be found in the hosting environment elements of the provider presence information. A given hosting environment may be associated with a given service instance.

A "service interface" of a service provider is a "service qualifying characteristic" and may receive service requests from clients and may have a plurality of servers of the service provider coupled thereto with the interface allowing the servers to share information. For example, a security server to provide authentication and/or authorization services may be coupled to the service interface. In some embodiments, a service provider providing services may permit multiple service instances on higher throughput systems while maintaining a common service interface across a spectrum of implementations. One or more service interfaces may be associated with a given service instance.

A "capability" of a service instance is a "service qualifying characteristic" and may include a capability of a particular implementation of the particular service instance. For example, illustrative capabilities may be service type, e.g., video, audio or audio/video, 3D, etc., a number of qualities, e.g., low, medium and high, the security levels of the service instances and/or like capabilities. A capability may further define a service provided by a service instance.

"Location" of a service provider is a "service qualifying characteristic" and may include a geographical and/or topological location of the service provider. In some embodiments, a service provider having a location more proximate to a client may be more desirable than a service provider having a location more remote to the client, when the client selects a service provider. Topological location may refer to the closeness of the service provider to the client by way of the network (e.g., length and/or number of links between the service provider and the client).

"Presence information" may consist of an arbitrary number of elements, and may include "provider presence information" describing one or more the service providers and "client presence information" describing one or more clients.

"Provider presence information", which may describe one or more service providers, may include for each service provider a communication address and a "provider status". In some embodiments, the provider presence information also may include one or more available "service instances". In some embodiments, the provider presence information also may include one or more "service qualifying characteristics".

"Status" is part of the presence information and may include "client status" in the client presence information and "provider status" in the provider presence information. "Client status" refers to the availability (e.g., online) of a client to receive instant messages. In accordance with various embodiments of the present invention, "provider status" may have at least two states: the service provider is "available" or the service provider is "unavailable". In some embodiments, "available" may mean "online" (connected and available) with respect to the "network".

"Service qualifying characteristic(s)", which may be part of the provider presence information, may be used by a watcher client to select or not select a given service provider or service instance of a given service provider. The service qualifying characteristic(s) may include "hosting environment", supported "service interfaces", "capabilities", "location" and/or other like factors. In some embodiments, the service qualifying characteristics may be elements in the "provider presence information" separate from the service instances. In other embodiments, one or more service qualifying characteristics may be incorporated into the definition of the "service instance", thereby eliminating the need for it to be part of a separate service qualifying characteristic element in the provider presence information.

"Service selection criteria(ion)" are criteria(ion) which are used by a client, when examining the provider presence information for a given service provider, to select for connection a service instance included in the provider presence information. In some embodiments, the service selection criterion may include only the "provider status" indicating that the service provider is available. In some embodiments, the service selection criterion may include the availability of a service instance. In other embodiments, the service selection criteria, in addition to the availability of the service instance, also may include one or more "factors related to service qualifying characteristics".

"Factors related to service qualifying characteristics" associated with a service instance may include one or more "service qualifying characteristics" or a range encompassing one or more the service qualifying characteristics or a limit exceeded by or not exceeded by one or more service qualifying characteristics or some other factor related to or based on one or more service qualifying characteristics, with the service qualifying characteristics being associated with the service instance.

A "network" for interconnecting IM servers, clients and/or service providers may include one or more networks to facilitate and/or coordinate the exchange of information, such as instant messages and presence information. Examples of the one or more networks may include packet networks (e.g., the internet), intranets, wired networks, wired telephone networks, wireless telephone networks, satellite networks, cable networks, wide area networks (WANs) and/or local area networks (LANs). For example, in one embodiment, the IM servers may be interconnected by the internet.

With reference to FIG. 1, there is illustrated a presence and instant messaging" (IM) system 10, according to some embodiments of the present invention, which implements a presence protocol. The IM system 10 includes a plurality of IM servers 12, a plurality of service providers 14, and a plurality of clients 16 which may be communicatively coupled to the network 18 and therefore may be communicatively coupled to each other.

As an overview, the service providers 14 send provider presence information over the network 18 to the IM servers 12 using the presence protocol. The elements of the provider presence information for a given service provider 14 includes at least the communication address and provider status. In some embodiments, the provider status being "available" is an indication that one or more service instances are available, without having to specifically list the service instances. In other embodiments, in addition to the communication address and provider status, the presence information may include a list of one or more available service instances. In some embodiments, the provider presence information also may include additional elements of one or more service qualifying characteristics.

At least the distribution of the provider presence information by the IM servers 12 to the watcher clients 16 essentially may be in accordance to the same presence protocol established for distributing client presence information to IM watcher clients 16 for subsequent instant messaging. In some embodiments, the receipt of the provider presence information by the IM server 12 from the service providers 14 essentially may be in accordance with the same presence protocol established for receiving client presence information from presentity clients 16 and used for subsequent instant messaging.

In providing its presence service, one of the IM servers 12 may execute a server presence program to receive the provider presence information from one or more service providers 14 via the network 18, to store the provider presence information in memory, and to distribute the provider presence information over the network 18 to one or more watcher clients 16. The watcher client 16 may have a client presence program for receiving the provider presence information. In some embodiments, the watcher client 16 may have a search program for searching the downloaded provider presence information.

Using the presence protocol and service, the service providers 14 may update the provider presence information previously provided to the IM servers 12 and the IM servers 12 may update the provider presence information previously provided to the watcher clients 16. In some embodiments, the IM servers 12 may share the provider presence information among each other, so that watcher clients 16 may obtain updated presence information from any of the IM servers 12 that share the provider presence information. In accordance to the presence service provided by the IM server 12, the watcher client 16 may obtain the provider presence information by being a fetcher (explicitly asking for it from the IM server 12) or by being a subscriber (e.g., automatic notification by the IM server 12). In some embodiments, the IM server 12 may distribute provider presence information to the watcher clients 16 regardless of whether the provider status is set to be "available" or "unavailable". In other embodiments, distribution of the provider presence information by the IM servers 12 to the watcher clients 16 may be limited to provider presence information with a provider status of "available".

In some embodiments, the watcher client 16, wanting to connect with a specific service instance, may check its availability in the provider presence information. For example, if the provider presence information includes this specific instance in its list of service instances (list of subservices), then this indicates to the client watcher 16 that this specific service instance is available from the service provider 14 which provided the provider presence information. In some embodiments, this may be enough for the watcher client 16 to select the service instance. In this case, there is a single selection criterion—the availability of the service instance—that must be met prior to the watcher client 16 selecting the service instance for connection.

In other embodiments, a given watcher client 16 may select a service instance of a service provider 14 using service selection criteria that not only include its availability, but also service selection criteria based on one or more service qualifying characteristics contained in the provider presence information associated with the service instance or the service provider. In other words, even if the specific service instance is available, the watcher client 16 may make a further determination as to whether or not to use the specific available service instance based upon inspecting the service qualifying characteristics associated with the available specific service instance. For example, if an instance doesn't support any of the interfaces that the watcher client 16 is looking for, then it may skip ever connecting to that instance at the service provider 14, which in turn will save on traffic, load, and so forth.

In some embodiments, the provider service information may be displayed, for example on a monitor of the client 16, so that a user of the client 16 may make the further determination as to whether a specific instance is to be selected. In other embodiments, the search program in the client 16 may make the determination. In some embodiments, the provider presence information from one or more service provider 14 may be downloaded by the IM client to the memory of the watcher client 16 and may be formed into a searchable service directory, with such downloading being in accordance with the presence service and protocol of the IM server 12. The watcher client 16 may execute the search program to search the downloaded provider presence information (e.g., service directory) and to select a service provider 14 to locate a desired available service instance. In some embodiments, the search program may use service selection criteria, which includes at least a desired service instance. In some embodiments, the service selection criteria may also include one or more desired service qualifying characteristics or ranges of the desired characteristics.

Upon selecting a service instance of a service provider 14, the watching client 16 may use the communication address to submit a service request to the selected service provider 14. In some embodiments, the communication address of the service provider 14 may not only include a network address, such as an Internet Protocol (IP) address, but the communication address also may include an additional service instance identifier to assist in coupling with the selected service instance at the service provider 14. The IM system 10, according to some embodiments of the present invention, will now be described in more detail.

Figure 2:
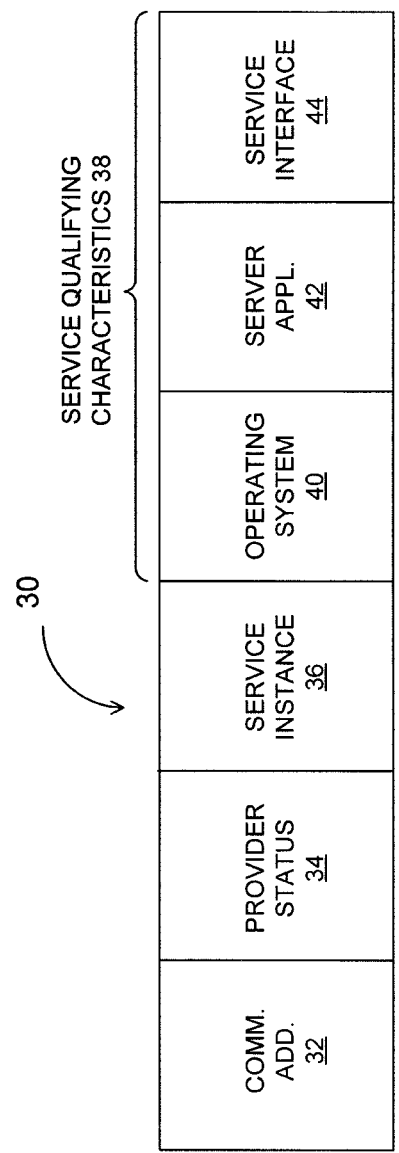
FIG. 2 is a diagram of provider presence information, according to some embodiments of the present invention.

With reference to FIG. 2, a diagram of an illustrative resource record 30 is shown, according to some embodiments of the present invention. There may be one or more resource records 30 established in a memory of the IM server 12 of FIG. 1. Each resource record 30 may contain the "provider presence information" defined above for a given service provider 14. As described above in the definitions, the provider presence information contained in a specific resource record 30 may include a number of elements, with the type and number of elements varying.

With reference to FIGS. 1 and 2, the resource record 30 is illustrated with provider presence information for a given service provider 14. The provider presence information included in the resource record 30 is illustrated with a communication address 32, a "provider status" 34, and a single available "service instance" 36. For the service qualifying characteristics elements 38 of the provider presence information is illustrated with "hosting environment" elements of an operating system 40 and server application software 42.

Additionally, a "service interface" element 44 is included. In some embodiments, a location may be included.

The communication address 32 may include, for example, an Internet Protocol (IP) address of the service provider 14. In some embodiments where the service provider has servers with virtual machines (VMs), then the communication address may also include a VM identifier. The previously-defined "provider status" may indicate whether a given service provider 14 is available or unavailable (e.g., online). Although only one service instance 36 is shown for the service provider 14, the resource record 30 may include a list of service instances that are available when the provider status is set to "available". In some embodiments, for each service instance that is available and listed in the provider presence information, the resource record 30 may also include "service qualifying characteristics" elements 38 for each service instance, with these elements 38 being used by the watcher client device 16 for selecting a given service instance. As defined above, the service qualifying characteristics elements 38 may include hosting environment elements, supported service interfaces, supported capabilities, location and/or other like factors. In some embodiments, the service qualifying characteristics 38 may be associated with the service provider 14 but not a specific one of a plurality of service instances.

The data structure of the resource record 30 shown in FIG. 2 may be characterized as including a presence string of a variable number of service instances (although only one service instance is shown); however, the resource record 30 may take many different forms. For example, in another embodiment, the resource record 30 may have a specified field associated with a given service instance and a digital one may indicate that it is available and digital zero may indicate that it is not available. Similar data structures may be used for the service qualifying characteristics associated with the service instances.

Figure 3:
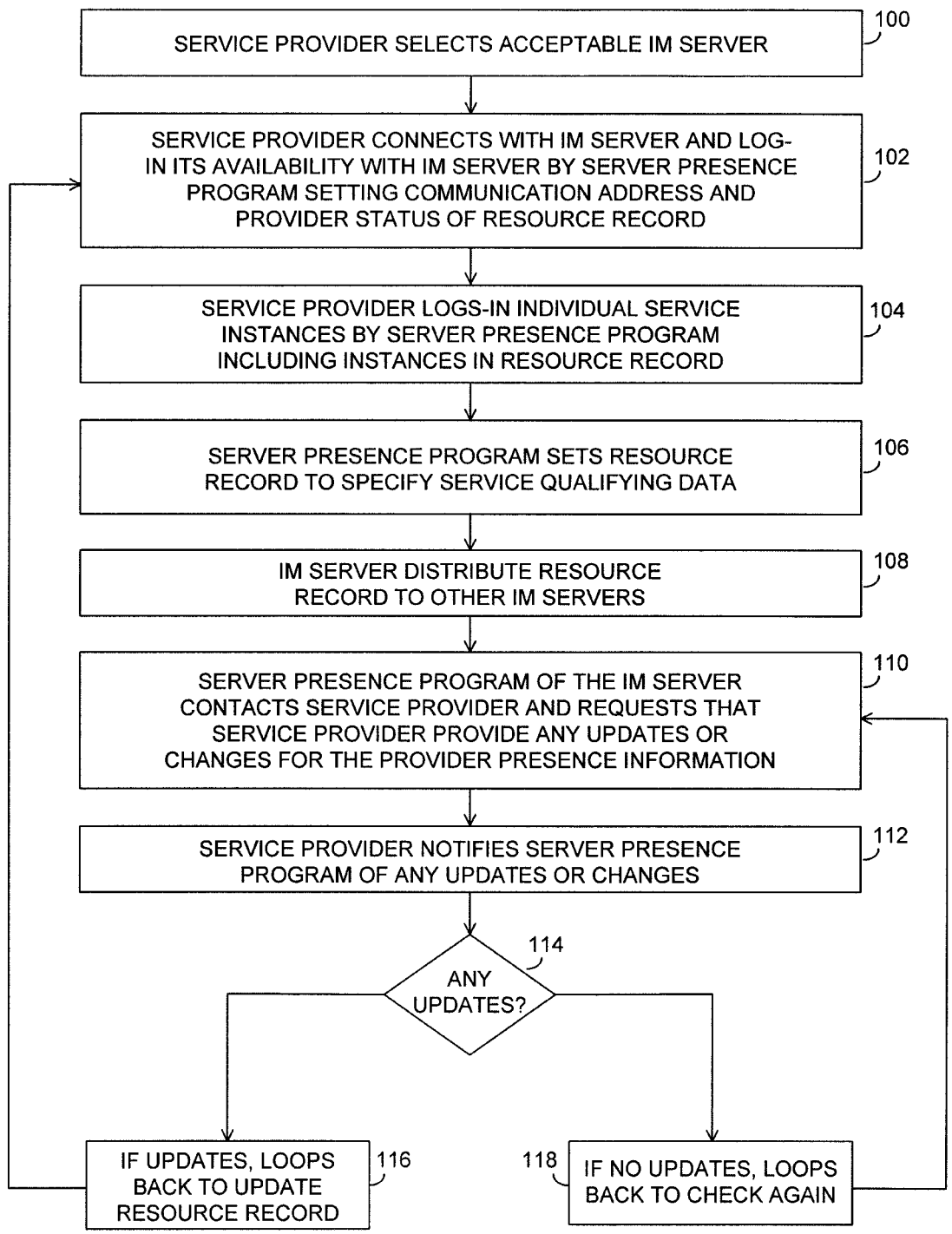
FIG. 3 is a flow chart of operations of a server presence program of an IM server in FIG. 1 for obtaining provider presence information from service providers and for forming resource records, according to some embodiments of the present invention.

With reference to FIG. 3, there is illustrated a flow chart of operations of the server presence program of the IM system 10 of FIG. 1, according to some embodiments of the present invention, for obtaining provider presence information from the service providers 14 and for forming the resource records 30. With reference to FIGS. 1-3, in a given service provider 14, once a service is loaded, specific service instances of the service may be opened for use. In an operation 100, a given service provider 14 may select an acceptable IM server 12 to which it may upload its provider presence information. A good IM server 12 is one having the functionality to receive, store and distribute the provider presence information, in addition to client presence information.

In an operation 102, a service provider 14 may connect with an IM server 12 and may log-in its availability with the IM server 12. More specifically, once the service provider 14 is connected, the server presence program may set the "provider status" of a resource record 30 for the connected service provider 14 to "available" (or other designation, as appropriate), based upon the provider presence information provided by the connected service provider 14. The IM server 12 may also include the communication address of the connected service provider 14 in the resource record 30.

In an operation 104, the service provider 14 may log-in individual service instances of one or more services, with such service instances being available at the service provider 14. More specifically, the execution of the server presence program at the IM server 12 may set the resource record 30 in the IM server 12 to describe what service instances are available from the connected service provider 14, based upon the provider presence information provided by the service provider 14. Hence, these service instances are associated with the connected service provider 14.

In some embodiments, in an operation 106, the server presence program also may set the resource record 30 to specify what "service qualifying characteristics" (presence elements for hosting environment, interfaces, capabilities, location and/or like elements, as defined above). However, the elements of the service qualifying characteristics may differ, depending on the embodiment.

In an operation 108, the IM server 12 receiving the provider presence information from the service provider 14 may distribute its resource record 30 to other IM servers 12 connected to the network 18. For example, the network 18 may include the internet and the resource record 30 may be distributed over the internet to the other IM servers 12. In FIG. 1, these IM servers are illustrated as being in different locations, such as Asia, Brazil, Europe and Oregon.

In some embodiments, the server presence program of the IM server 12 may obtain updates or changes for the provider presence information from the service providers 14. With respect to such updates, the server presence program may update the resource record 30 for that service provider 14 contained in the memory. In some embodiments, as illustrated in FIG. 3, the server presence program may loop back and obtain the updates or changes to the provider presence information on a fetching basis (e.g., periodically polling the service provider 14). However, this is just one possibility for obtaining updates and other implementations of the updating process may be undertaken. For example, in some embodiments, the service provider 14 may notify the IM server 12 when there is a change in its provider presence information; in which case, the server presence program updates the resource record 30 on a notification or subscriber basis.

In an operation 110, the server presence program of the IM server 12, after a delay, may contact the service provider 14 and request that the service provider 14 provide any changes or updates of the provider presence information, if any, contained in its resource record 30 (including adding or subtracting elements). In operation 112, the service provider 14 notifies the server presence program as to whether there are any updates or changes. If there are updates or changes in operation 114, in an operation 116 the server presence program loops back to update resource record 30. If there are no updates or changes in the operation 114, in an operation 118 the server presence program, after a delay, may loop back to check the service provider 14 again. This procedure for obtaining updates and changes may be repeated for each service provider establishing a resource record 30.

Figure 4:
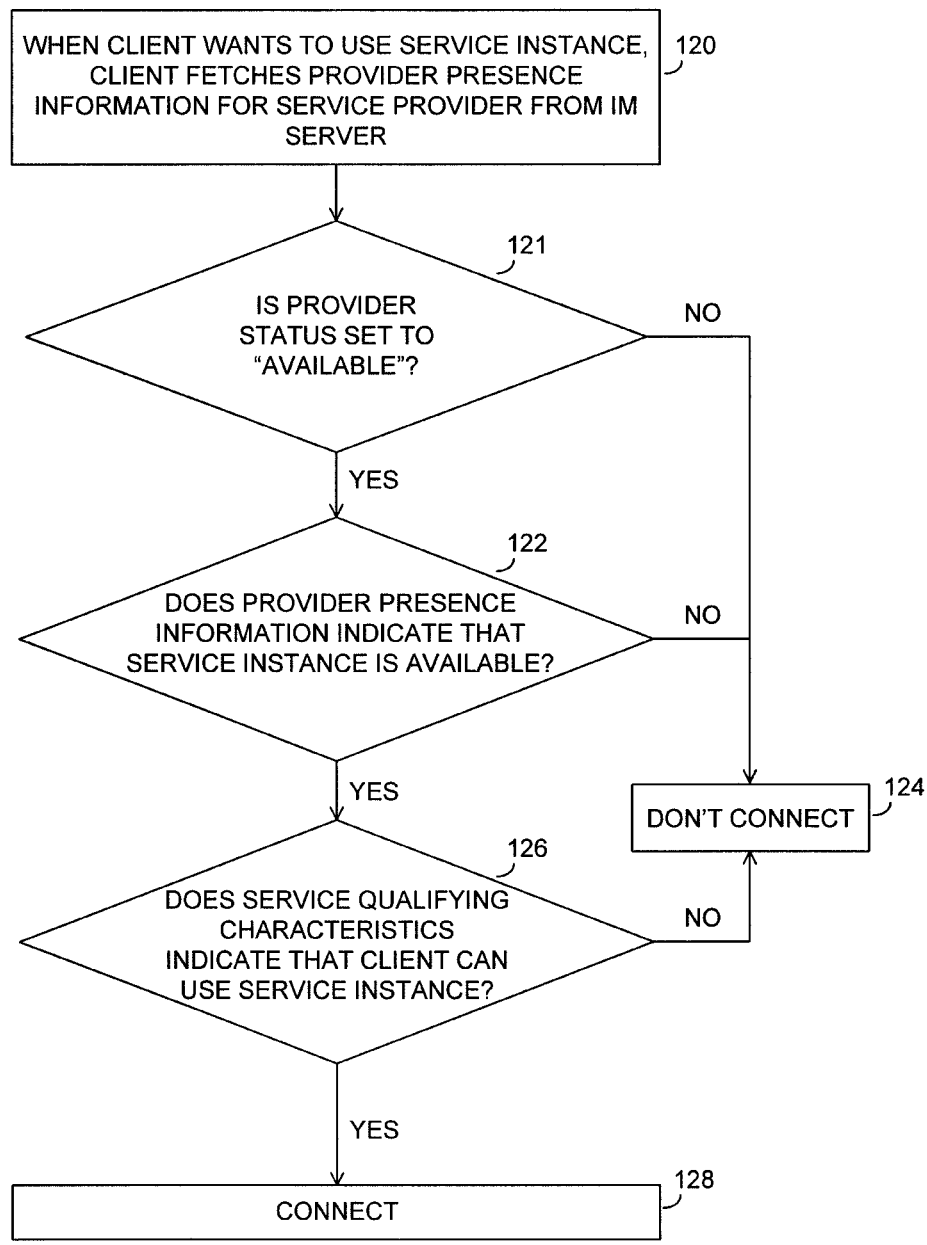
FIG. 4 is a flow chart of operations of a client presence program of a client in FIG. 1, according to some embodiments of the present invention.

With reference to FIG. 4, a flow chart of the presence service of the IM system 10 of FIG. 1, according to some embodiments of the present invention, is shown for distributing the provider presence information to given client 16. Also, the flow chart of FIG. 4 shows the operations of the client 16 for receiving and using the provider presence information. In general, a client presence program may receive and process the client presence information obtained from the IM server 12. Depending on the configurations of the server presence program of the IM server 12 and the client presence program in the watcher client 16, the presence service may configure the watcher client 16 to be a "fetcher" or a "subscriber", as previously defined. The flow chart of FIG. 4 is illustrated with the client 16 as being a fetcher.

With respect to FIGS. 1 and 4, when the watcher client 16 wants to use a particular service instance of a service provider 14, in an operation 120, the client presence program of the watcher client 16 may fetch the provider presence information (e.g., resource record 30) for that service provider 14 from the IM server 12, if available. In an operation 121, the client presence program may determine if the provider status is set to "available". If it is set to "available", then the client presence program proceeds to an operation 122 and if it is set to "unavailable, then the client presence program proceeds to an operation 124 (no connection). In the operation 122, the client presence program may determine if the service instance is available by inspecting the list of service instances, if any, in the provider presence information for the service provider 14. If the provider presence information does not indicate that the particular service instance is available, then in an operation 124, the client 16 would not connect to the service provider 14.

If the provider presence information indicates that the particular service instance is available, then in an operation 126, the client presence program of the client 16 may evaluate or examine the service qualifying characteristics elements, if any, of the provider presence information to determine whether to use the service instance. If the client presence program decides to connect based upon the availability and possibly also the service qualifying characteristics elements, then the presence service may proceed to operation 128, where the client uses the communication address from the provider presence information to connect with the service provider 14. If the client presence program decides not to connect based on the service qualifying characteristics elements, then the client presence program may proceed to operation 124.

In some embodiments, the operations 122 through 128 may be undertaken by the client presence program without the intervention of the user of the client 16. In some embodiments, the operations 122 through 128 may be manually undertaken by the user of the client 16. The provider presence information may be displayed by the client presence program, for example on a monitor of the client 16, so as to allow the user of the client 16 to inspect the provider presence information and make a determination of whether the client 16 wants to connect to the service provider 14 to obtain the particular service instance.

Figure 5:
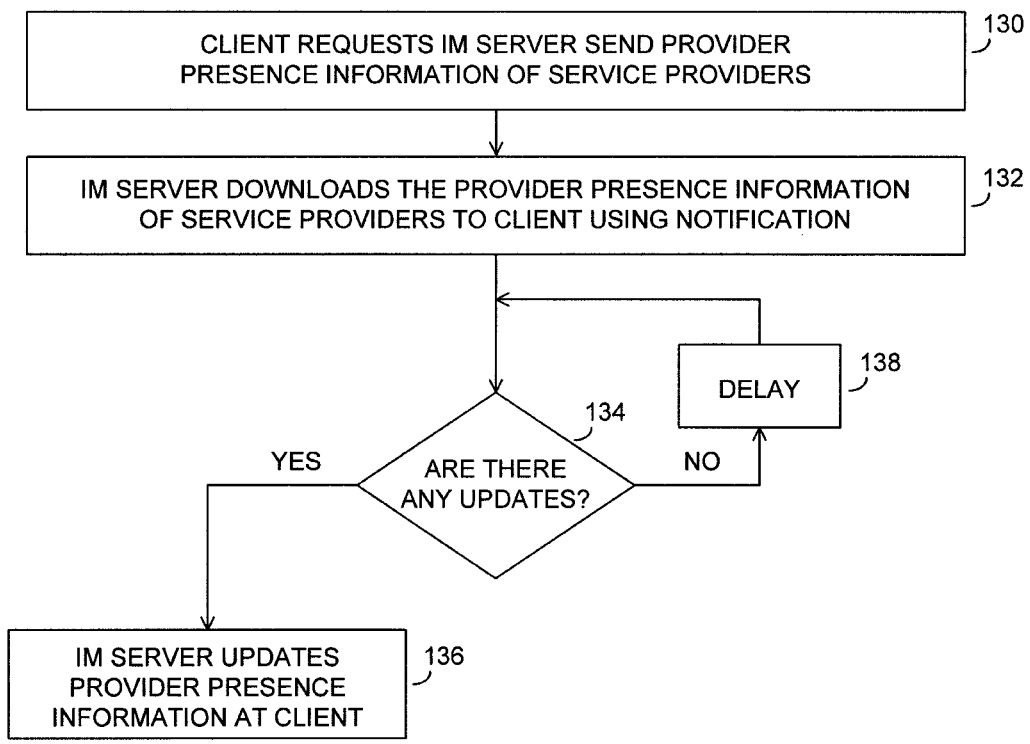
FIG. 5 is a flow chart of operations of a server presence program of an IM server in FIG. 1 for distributing client presence information to clients, according to some embodiments of the present invention.
Figure 6:
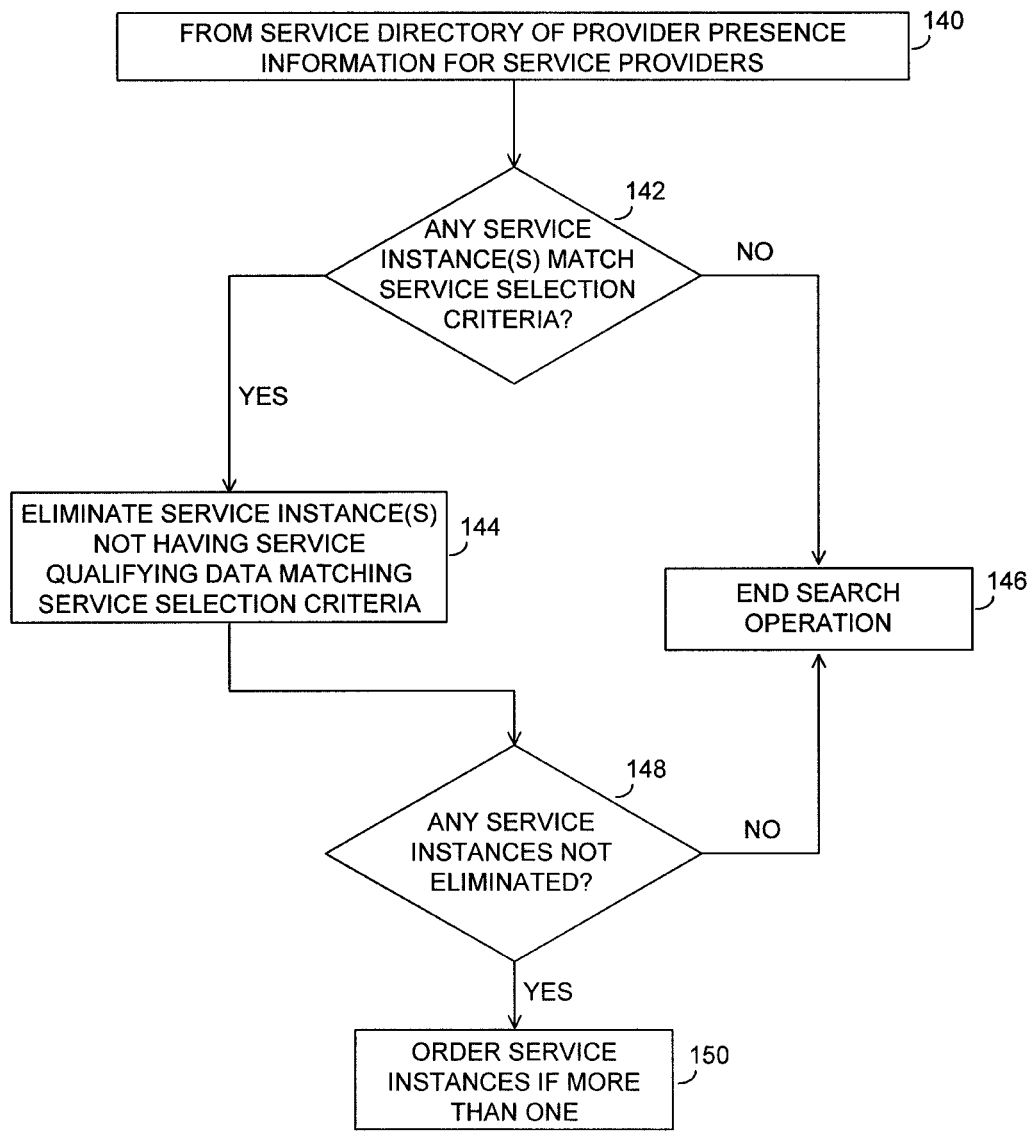
FIG. 6 is a flow chart of client presence and search programs of a client in FIG. 1, according to some embodiments of the present invention.

FIGS. 5 and 6 illustrates the IM system 10, according to other embodiments of the present invention, wherein the server and client presence programs may allow for a searchable service directory to be formed in the memory of the client 16 of FIG. 1. The client 16 may also execute a search program to search the service directory and to select one or more preferred service instances based upon a comparison of the provider presence information from multiple service providers 14 with service selection criteria set for the search program to select the one or more preferred service instances. The service selection criteria may reflect the acceptable services instances and acceptable service qualifying characteristics or ranges of acceptable service qualifying characteristics. In some embodiments, the search program may provide an ordering of preferred service instances to use, with such ordering being based upon the extent to which the provider service information of the preferred service instances meet the service selection criteria. As with the embodiment of FIG. 4, if a service instance doesn't support any interface that the client likes or lacks desired capabilities not available with that service instance, then the client 16 may skip ever connecting to that service instance, thereby saving traffic, load, and so forth.

FIG. 5 is a flow chart of the operations of the server presence program for distributing the provider presence information to the watcher clients 16. With respect to FIGS. 1 and 5, in an operation 130, the watcher client 16 may initially request that the server presence program of the IM server 12 download the provider presence information, for example, from a number of service providers 14. In an operation 132, the server presence program of the IM server 12 may download the provider presence information (e.g., resource records 30 of FIG. 2) for a plurality of service providers 14 to the client 16. In an operation 134, the server presence program may check to see if the IM server 12 has received any updates for the provider presence information previously downloaded to the client 16. The server presence program may periodically check to see if it has received updates. If there are updates, in an operation 136, the server presence program of the IM server 12 may send the updates to the client 16 to update the provider presence information using notification. If there are no updates, then with a delay at operation 138, the server presence program may loop back and check again later.

FIG. 5 shows how the fetching and soliciting functions may be switched for the watcher client 16, with the client 16 being configured to obtain updates to the provider presence information through notification from the IM server 12, instead of fetching this information as undertaken in FIG. 4. In other embodiments, the server presence program of the IM server 12 may provide updates or changes to the client 16 when they are received from the service providers 14 instead of periodically checking to see if it has received updates. In other embodiments, the watcher client 16 may fetch the updates or changes from the IM server 12 (e.g., periodically poll the IM server 12 to obtain the updates).

FIG. 6 is a flow chart of a client presence and search program of the watcher client 16, according to some embodiments of the present invention, wherein the client presence program may organize a searchable service directory in the memory of the watcher client 16 of FIG. 1 and the search program may search the service directory to select one or more preferred service instances. In an operation 140, the client presence program of the watcher client 16 may form the searchable service directory of the provider presence information for the service providers 14. For example, the client presence program may form a list of available services and one or more lists of service qualifying characteristics associated with the list of available services, thereby generating the service directory.

When the watcher client 16 wants to use a particular service instance, the search program of the watcher client 16 may search the service directory to find one or more preferred service instances, with the search program using service selection criteria to select the one or more preferred service instances. The service selection criteria may include desired service instance(s) and desired service qualifying characteristics or ranges for the desired service qualifying characteristics. More specifically, in an operation 142, the search program may search the list of available service instances. If the search program determines that one or more of the service instances from the list of available service instances in the service directory match the service selection criteria, then the search program may proceed to an operation 144. If not, then the search program may proceed to an end search operation 146, where "no compatible service available" may be displayed on a display device of the watcher client 16.

In the operation 144, the search program of the client 16 may evaluate one or more lists of service qualifying characteristics for each of the service instances selected in the operation 142 and may eliminate one or more of the service instances not having service qualifying characteristics matching the service selection criteria. In an operation 148, the search program determines if any service instances have not been eliminated after operation 144. If one or more service instances remain, then the search program may proceed to operation 150 where the search program may priority order the remaining service instances based upon how well they meet the service selection criteria, if there are more than one preferred service instance. If there are no remaining service instances after the operation 148, then the search program may proceed to the end search operation 146.

The IM system 10, according to some embodiments of the present invention, may provide an open, standard, and infrastructure-aware mechanism for clients 16 to locate and use service providers 14. By keeping the information as part of the infrastructure (e.g. the data transport system of the IM servers 12), not only are the clients 16 and IM servers 12 free from having to have their own, separate systems, but the infrastructure itself may be enabled to "weed out" clients and services that aren't compatible with (or even well-suited to) each other.

The IM service of the IM server 12, according to the some embodiments of the present invention, may be utilized to overcome firewall issues as instant messaging is typically added as an additional layer to the TCP/IP stack. Hence, by utilizing the established IM service, firewall issues may be reduced in the IM system 10.

Figure 7:
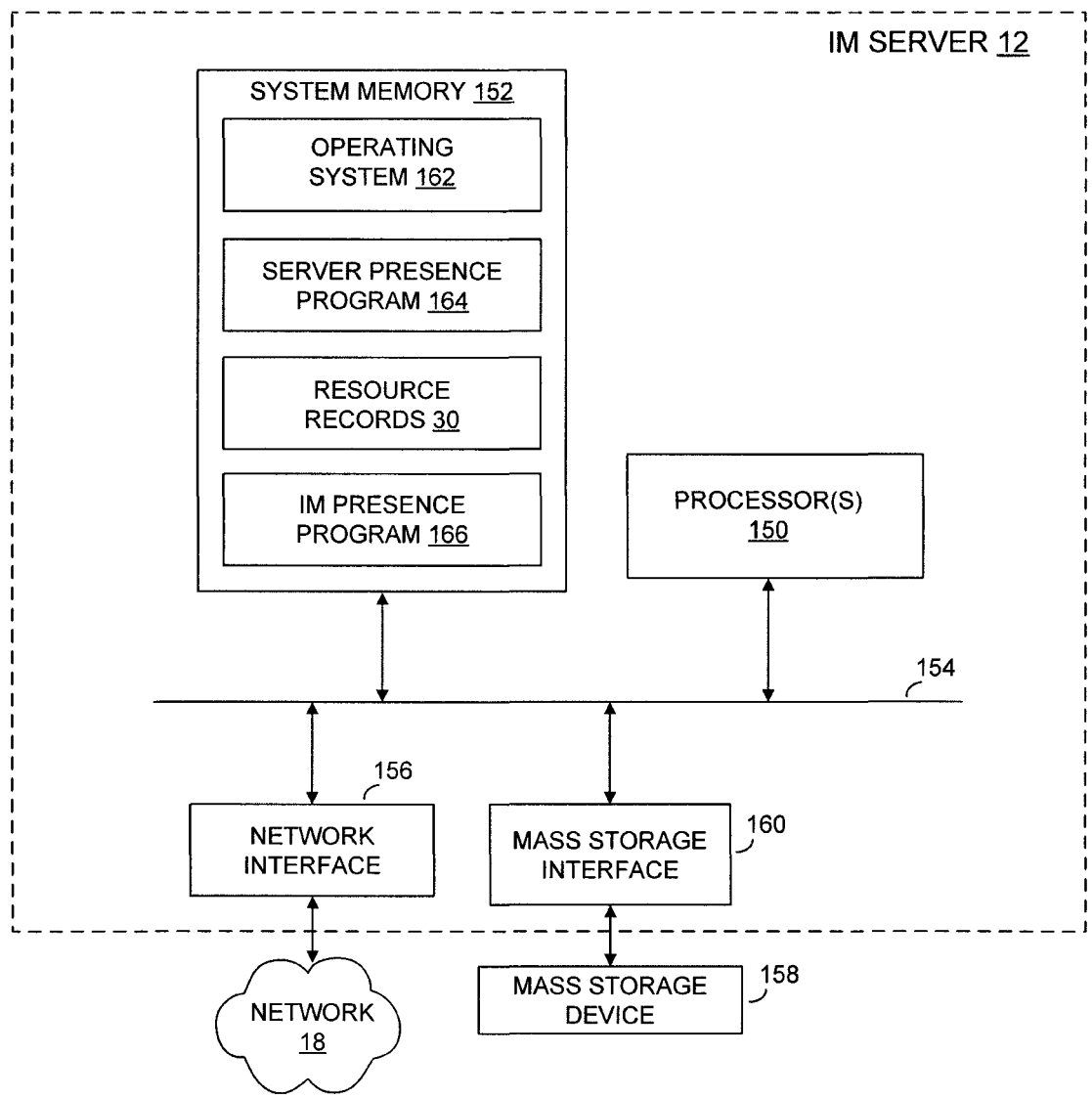
FIG. 7 is a block diagram of an illustrative IM server which may form part of the IM system of FIG. 1, according to some embodiments of the present invention.

With reference to FIG. 7, an exemplary IM server 12 of FIG. 1, according to some embodiments of the present invention, is shown. The IM server may include one or more processor(s) 150, a system memory 152, and a system bus 154, which joins the system memory 152 to the processor(s) 150. There may be one or more processors 150. A network interface 156 may couple the network 18 to the IM server 12 via the bus 154. A mass storage device 158 may be coupled to the bus 154 by way of a mass storage interface 160. The system memory 152 may include random access memory (RAM) for containing an operating system 162, a server presence program 164, the resource records 30, and an IM presence program 166. The IM server 12 may include a number of other components.

The system memory 152 also may include read only memory with a basic input/output system (BIOS) that contains basic routines, such as for loading the operating system 162 from the mass storage device 158 to the RAM of the system memory 152 during start-up or reboot. Likewise, once loaded, the operating system 152 may load the server presence program 164 from the mass storage device 158. Generally, the resource records 30 may be created and maintained in the RAM of the system memory 152. The server presence program 164, when executed by the processor(s) 150, may provide the previously described presence service wherein the IM sever 12 obtains provider presence information from one or more service providers, may form resource records 30 for the service providers, and may distribute the provider presence information to watcher clients. In some embodiments, the server presence program, when executed by the processor(s) 150 may perform the operations of FIGS. 3 and 5. The IM presence program 166, when executed by the processor(s) 150, may provide the previously described presence service wherein the IM sever 12 obtains client presence information from one or more presentity clients and distribute the client presence information to watcher clients to support the IM service.

According to some embodiments of the present invention, an article comprising a machine-readable storage medium that contains instructions of a server presence program for an instant messaging (IM) server may be used. The instructions, when executed by the IM server, may cause the IM server to perform operations such as: receiving client presence information by the IM server from at least one presentity client, storing the client presence information in a memory of the IM server, distributing the client presence information by the IM server to at least one IM watcher client, receiving provider presence information by the IM server from at least one service provider, with the provider presence information including at least a service provider status of the at least one service provider, storing the provider presence information in the memory of the IM server, and distributing the provider presence information by the IM server to at least one service watcher client.

Figure 8:
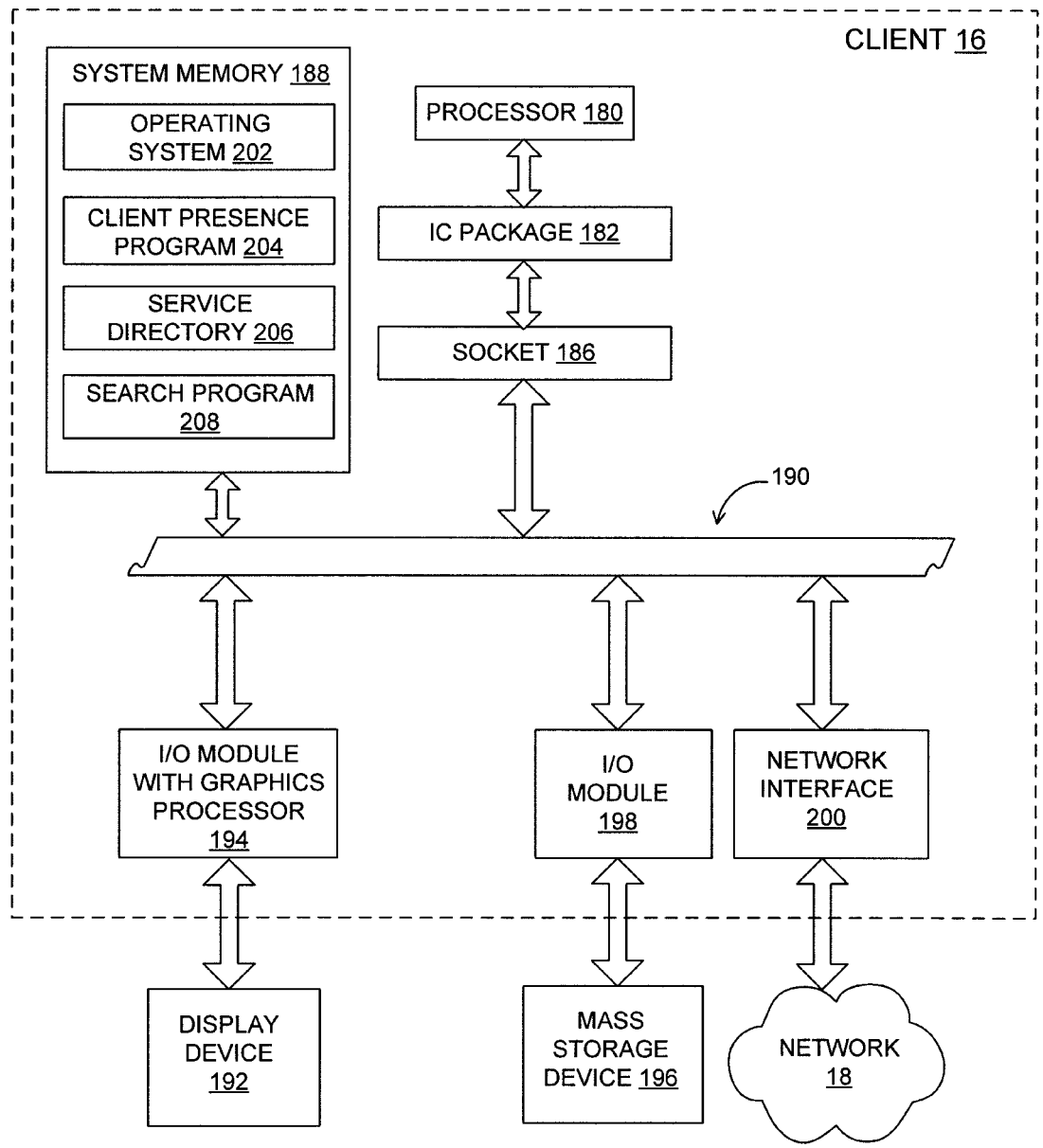
FIG. 8 is a block diagram of an illustrative client which may form part of the IM system of FIG. 1, according to some embodiments of the present invention.

With reference to FIG. 8, there is illustrated an exemplary client 16 which may form part of the IM system of FIG. 1, according to some embodiments of the present invention. The client 16 may include a processor chip or die 180 which is part of an integrated circuit (IC) package 182. The IC package 182 may be mounted on a substrate or printed circuit board (PCB) 184 via a socket 186. The processor chip 180 of the IC package 182 may be a processor and the PCB 184 may be a motherboard. However, in other systems the IC package 182 may be directly coupled to the PCB 184. In addition to the socket 186 and the IC package 182, the PCB 184 may have mounted thereon a system memory 188 and a plurality of input/output (I/O) modules for external devices or external buses, all coupled to each other by a bus system 190 on the PCB 184. More specifically, the client 16 may include a display device 192 coupled to the bus system 190 by way of an I/O module 194, with the I/O module 194 having a graphical processor and a memory. The I/O module 194 may be mounted on the PCB 184 or may be mounted on a separate expansion board. The client 16 may further include a mass storage device 196 coupled to the bus system 190 via an I/O module 198. The network 18 may be coupled to the bus system 190 via an I/O module (network interface) 200. Additional I/O modules may be included for other external or peripheral devices or external buses.

The system memory 188 may include an operating system 202, a client presence program 204, and in one embodiment, a service directory 206 and search program 208. The system memory 188 may include read only memory having may include a basic input/output system (BIOS) that contains basic routines, such as for loading the operating system 202 from the mass storage device 196 to the system memory 188 during start-up or reboot. Likewise, once loaded, the operating system 202 may load the client presence program 204 and the search program 208 from the mass storage device 196. The client presence program 204, when executed by the processor(s) 180, may fetch or receive by notification the provider presence information from the IM client via the network interface 200, which is coupled to the network 18. The search program 208, when executed by the processor(s) 180, may search the provider presence information in the service directory 206 to locate one or more preferred service instances. In other embodiments not using the search program 208 or forming the search directory 206, the provider presence information for a given service instance may be displayed on the display device 192. In some embodiments, the client presence program 204, when executed by the processor(s) 180, may perform the operations of FIG. 4. In some embodiments, the search program 208, when executed by the processor(s) 180, may perform the operations of FIG. 6.

Figure 9:
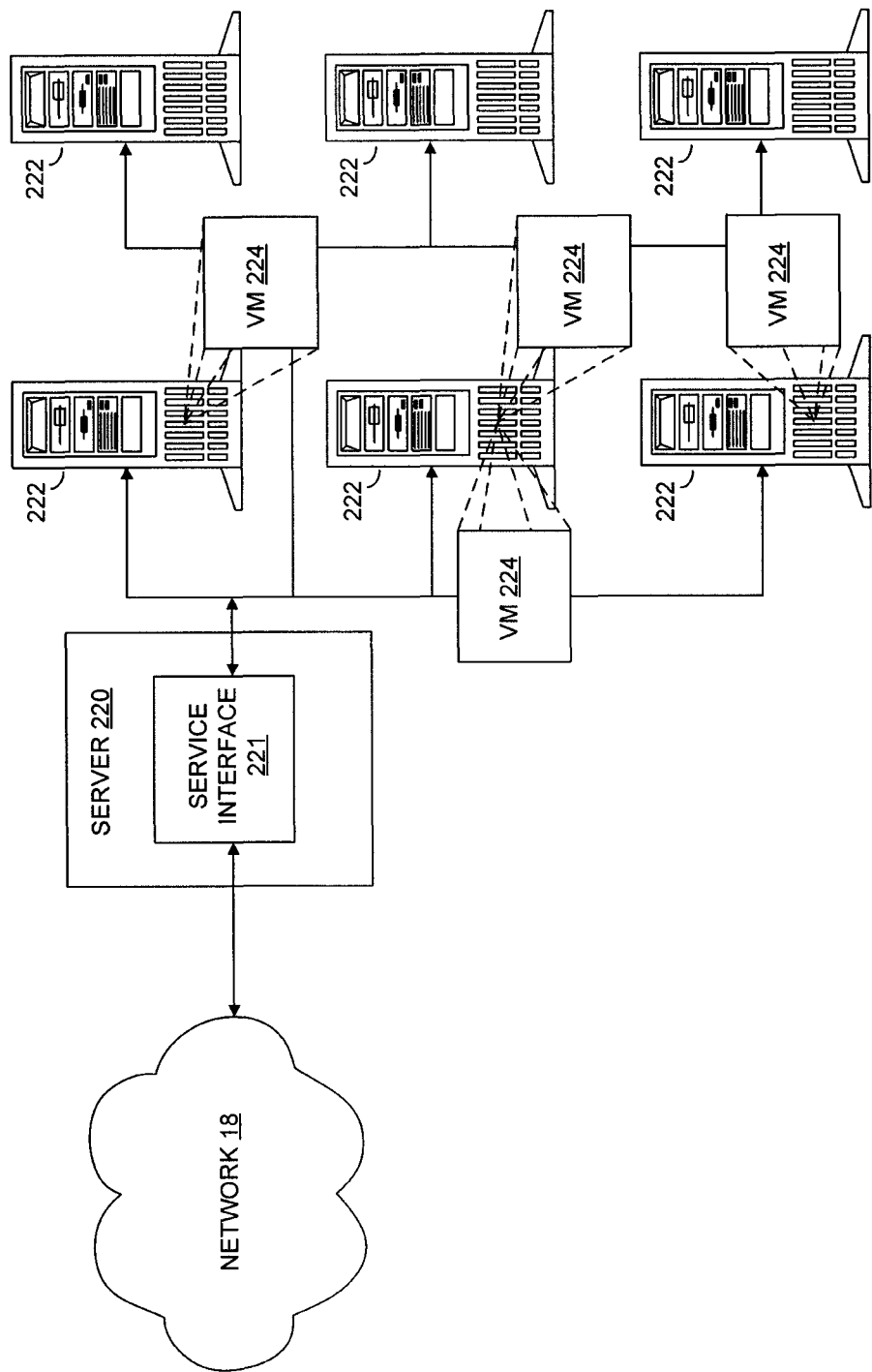
FIG. 9 is a block diagram of an illustrative service provider which may form part of the IM system of FIG. 1, according to some embodiments of the present invention.

With reference to FIG. 9, an illustrative service provider 14 which may be used in the IM system 10 of FIG. 1, according to some embodiments of the present invention, is shown. The service provider 14 may have at least one computer server 220 coupled directly to the network 18, with the server 220 having a "service interface" 221. In some embodiments, the service provider 14 may have a number of servers 222 coupled to the service interface 221. As previously defined, the service interface 221 of a service provider 14 may receive service requests from clients and may allow for the servers 220 and 222 to share information. The server 220 may include a processor or processors (not shown) and a system memory (not shown) coupled to the processor. The memory may include a presence generating program loaded therein by being moved from mass storage (not shown). The presence generating program, when executed by the processor(s), may generate provider presence information, such as that illustrated in FIG. 2.

In some embodiments, the service provider 14 may configure one or more servers 222 to have application software to provide one or more service instances having a particular hosting environment. This configuration may be fixed; hence, to offer other instances of services needing different, incompatible hosting environment elements, the service provider 16 may configure another server 222 with the other instances of services. In general, the service instances may be provided from different servers 220 and 222 with different service qualifying characteristics.

In some embodiments, one or more of the servers 220 and 222 of the service provider 14 may be configured to provide one or multiple virtual machines (VMs), which are illustrated in FIG. 9 as VMs 224. Rather than configuring individual machines or servers to offer services in multiple fixed combinations as described above, the VMs 224 may offer different service instances with different service qualifying characteristics. In some embodiments, a given VM 224 may offer multiple service instances, and a given service instance may be offered by multiple VMs 224. In some embodiments, different VMs 224 may offer different service instances. In some embodiments, different VMs 224 also may offer otherwise identical service instances with different service qualifying characteristics (e.g., different hosting environments). In some embodiments, the VMs may be created and deleted as needed, and may be installed on any available (or desired) server.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A client device, comprising:
a memory;
a presence module adapted to be located in the memory;
a service directory adapted to be located in the memory;
a search module adapted to be located in the memory; and
a processor coupled to the memory, the processor adapted to:
execute the presence module to configure the client device to receive service provider presence information in the service directory, wherein the service provider presence information includes at least
status information of one or more service providers and
one or more service qualifying characteristics associated with the one or more service providers, wherein the one or more service qualifying characteristics include hosting environment information of at least one of the one or more service providers, wherein the hosting environment information comprises one or more of an operating system, a version of a server program, patches, libraries, and/or managed runtime environments; and
execute the search module to autonomously select, by the search module, a service provider of the one or more service providers, based at least in part on the service qualifying characteristics stored in the service directory, and send a service request to the selected service provider.

2. The client device of claim 1, wherein the service provider presence information further includes one or more communication addresses corresponding to the one or more service providers and further comprising:
a network interface coupled to the processor, the network interface adapted to establish a connection with the selected service provider utilizing the corresponding communication address to enable the search module to send the service request to the selected service provider via the network interface.

3. The client device of claim 1, wherein to receive the service provider presence information, the processor is adapted to receive the service provider presence information on a selected one of a solicitation basis or a notification basis.

4. A computer-implemented method, comprising:
receiving, by a presence module of a client device, service provider presence information from a presence server;
storing, by the presence module, the service provider presence information in a service directory, with the service provider presence information including at least
status information of one or more service providers,
a list of a plurality of service instances offered by the one or more service providers, and
one or more service qualifying characteristics associated with respective service instances of the plurality of service instances,
wherein the one or more service qualifying characteristics include hosting environment information of at least one of the one or more service providers, wherein the hosting environment information comprises one or more of an operating system, a version of a server program, patches, libraries, and/or managed runtime environments; and
autonomously selecting, by a search module of the client device, a service instance of the plurality of service instances based at least in part on the service qualifying characteristics stored in the service directory.

5. The computer-implemented method of claim 4, wherein the service qualifying characteristics further include hosting environment information or capability information of at least one of the plurality of service instances, and wherein the service provider presence information further includes a communication address associated with respective service instances of the plurality of service instances and further comprising:
sending, by the search module, a service request to the selected service instance utilizing the communication address.

6. The computer-implemented method of claim 4, wherein receiving the service provider presence information further comprises receiving the service provider presence information on one of a solicitation basis or a notification basis.

7. An article of manufacture, comprising:
a non-transitory machine-readable storage medium that contains first and second instructions which when executed by a client device, provide the client device with a presence module and a search module, respectively, the presence module to:
receive service provider presence information from a presence server;

store the service provider presence information in a service directory, with the service provider presence information including at least
   status information of one or more service providers
   a list of a plurality of service instances offered by the one or more service providers, and
   one or more service qualifying characteristics associated with respective instances of the plurality of service instances,
   wherein the one or more service qualifying characteristics include hosting environment information of at least one of the plurality of service instances, wherein the hosting environment information comprises one or more of an operating system, a version of a server program, patches, libraries, and/or managed runtime environments; and
the search module to autonomously:
   determine whether the service qualifying characteristics meet one or more service selection criteria; and
   select a service instance of the plurality of service instances based on a the results of the determination.

8. The article of claim 7, wherein the service qualifying characteristics further include location information or capability information of at least one of the plurality of service instance, and wherein the search module is further:
   send a service request to the selected service instance.

9. The article of claim 7, wherein the service provider presence information is received on a selected one of a solicitation basis or a notification basis.

10. The client device of claim 1, wherein the service provider presence information further includes a list of one or more service interfaces correspondingly supported by the one or more service providers and selecting a service provider is further based on the service interface supported by the service provider.

11. The computer-implemented method of claim 4, wherein the service provider presence information further includes a list of service interfaces respectively supported by the plurality of service instances and selecting a service instance is further based on the service interface supported by the service instance.

12. The article of manufacture of claim 7, wherein the service provider presence information further includes a list of service interfaces respectively supported by the plurality of service instances and the one or more service selection criteria includes a designation of service interfaces compatible with the client device.

13. The client device of claim 1, wherein the service provider presence information includes a list of a plurality of service instances associated with each service provider and to select a service provider further includes selection of a service instance associated with the selected service provider.

14. The client device of claim 2, wherein the communication address includes a virtual machine identifier associated with the service provider and to establish a connection with the selected service provider further includes utilizing the virtual machine identifier.

15. The client device of claim 5, wherein the communication address includes a service instance identifier associated with the selected service instance and to establish a connection with the selected service instance further includes utilizing the service instance identifier.

16. The client device of claim 1, wherein the hosting environment information includes an identifier of one or more of an operating system, patches, libraries, or a runtime environment of the at least one of the one or more service providers.

17. The client device of claim 1, wherein the one or more service qualifying characteristics include location information of each of the one or more service providers.

18. The client device of claim 17, wherein the location information of each of the one or more service providers includes an indication of topological proximity between the client device and a respective service provider of the one or more service providers on the network.

19. The client device of claim 1, wherein the one or more service qualifying characteristics include capability information of each of the one or more service providers.

20. The client device of claim 19, wherein the capability information includes a security level associated with each of the one or more service providers.

* * * * *